United States Patent

Bueschl et al.

[11] Patent Number: 5,091,477
[45] Date of Patent: Feb. 25, 1992

[54] THERMOPLASTIC MOLDING MATERIALS

[75] Inventors: Rainer Bueschl, Roedersheim-Gronau; Peter Klaerner, Battenberg, both of Fed. Rep. of Germany

[73] Assignee: BASF Aktiengesellschaft, Ludwigshafen, Fed. Rep. of Germany

[21] Appl. No.: 494,316

[22] Filed: Mar. 16, 1990

[30] Foreign Application Priority Data

Apr. 5, 1989 [DE] Fed. Rep. of Germany ....... 3910942

[51] Int. Cl.[5] .................... C08F 8/299; C08F 45/00; C08F 67/02; C08F 71/12
[52] U.S. Cl. ........................... 525/152; 525/63; 525/68; 525/165; 525/210; 525/216; 525/905
[58] Field of Search ............ 525/216, 63, 68, 152, 525/165, 210, 905

[56] References Cited

U.S. PATENT DOCUMENTS

| | | |
|---|---|---|
| 4,083,821 | 4/1978 | Harris .................................. 525/216 |
| 4,849,479 | 6/1989 | Siol et al. ............................ 525/216 |
| 4,892,909 | 1/1990 | Siol et al. ............................ 525/216 |
| 4,898,912 | 2/1990 | Siol et al. ............................ 525/216 |
| 4,912,169 | 3/1990 | Whitmire et al. ................... 525/216 |
| 5,008,341 | 4/1991 | Bueschl et al. ..................... 525/216 |

FOREIGN PATENT DOCUMENTS 887080 7/1981 Belgium .
1745060 3/1972 Fed. Rep. of Germany .

OTHER PUBLICATIONS

Japanese Abstract 75-082159.
Japaanese Abstract 84-047446.

*Primary Examiner*—Jacob Ziegler
*Attorney, Agent, or Firm*—Oblon, Spivak, McClelland, Maier & Neustadt

[57] ABSTRACT

Molding materials of high impact polystyrene (HIPS) and one or more further polymers as essential components contain, as a third or further compatibility-imparting component, a polymer or copolymer containing not less than 45% by weight of units of cyclohexyl (meth)acrylate.

8 Claims, No Drawings

THERMOPLASTIC MOLDING MATERIALS

There is an evident need for novel thermoplastic molding materials having novel combinations of properties. The development of novel polymers is expensive and is hindered in particular by the lack of readily available novel monomers; polymer blends have therefore become very important. Here, two or more polymers of different chemical structures are combined by mixing (for example by extrusion) with the intention of obtaining a product whose properties represent a combination of those of the starting components or are even superior to these owing to synergistic effects.

In the case of styrene polymers, important and commercially successful blends are those of high impact polystyrene with polyphenylene ethers, or of ABS with polycarbonate.

Blends of polystyrene (PS or high impact PS) with styrene/acrylonitrile copolymers (SAN or toughened SAN) are known but are not available in practice although they are said to combine advantageous properties of the components. For example, polystyrene has good flow characteristics but poor stress cracking resistance to many agents, whereas ABS has poorer flow but high resistance to stress cracking corrosion.

A disadvantage of these blends is the deterioration in the mechanical properties due to the incompatibility of the two matrices.

The relevant prior art includes:
DE 17 45 060 (GB 11 51 040, 11 99 559) (1)
JA 75-082159 (2)
JA 84-047446 (3)
BE 887 080 (GB 20 67 579) (4)

In (1), blends of polystyrene or high impact polystyrene with acrylonitrile/styrene/butadiene copolymers (ABS) are proposed. (2) describes in particular polystyrene modified with ethylene/propylene/diene rubber (EPDM).

(3) describes a special application of blends of high impact polystyrene (HIPS) and ABS, which contain significant amounts of inorganic additives and are said to be suitable for the production of golf balls. In all cases, however, there are problems with the mechanical properties of the resulting products, in particular the toughness, as is evident from a closer examination of these proposals.

For the theory of compatibility of such polymer blends, reference may be made to G. L. Molau, Polymer Letters 3 (1965), 1007-1015, and R. Casper and L. Morbitzer, Angew. Makromol. Chem. 58/59 (1977), 1-35, who state that it is important that there are very small differences between the acrylonitrile contents of the base polymers. (4) therefore proposes mixing acrylonitrile-modified HIPS with pure high impact polystyrene or with ABS. However, the acrylonitrile-containing HIPS grades have the disadvantage that they cannot be prepared in conventional plants for the production of polystyrene. Moreover, the advantage of obtaining novel molding materials solely through the combination of an existing range of high impact polystyrene and acrylonitrile/butadiene/styrene copolymers (ABS) is lost here.

It is an object of the present invention to make high impact polystyrene compatible with other polymers and thus to improve the mechanical properties of the blends.

We have found that this object is achieved and that the mechanical properties of blends of high impact polystyrene (HIPS) and other polymers can be substantially improved if a small amount (for example as little as 1-5% by weight) of homo- or copolymers containing cyclohexyl methacrylate or acrylate is added to said blends. High impact polystyrene and the other components of the mixture may originate from the conventional commercial ranges. It is unimportant whether the rubber used for toughening has been prepared by the usual solution process or by emulsion polymerization. The type of rubber (eg. polybutadiene, EPDM, butylrubber, polybutyl acrylate, etc.) can also be freely chosen. Typical products are described in Kunststoffe 74 (1984), 538 et seq.

HIPS may contain further comonomers, such as acrylates, methacrylates, maleimide, substituted styrene (eg. α-methylstyrene) or a copolymerizable anhydride (eg. maleic anhydride), in a minor amount.

Polymers which are particularly suitable for the preparation of blends with HIPS are ABS polymers as well as polymethyl (meth)acrylate (PM(M)A), polyphenylene ethers (PPE), polyvinyl chloride (PVC) and thermoplastic polyesters. These polymers are commercially available.

Products which may be used as ABS are those which contain up to 35%, preferably up to 30%, very particularly preferably up to 25%, of acrylonitrile (AN) in the matrix. The ratio of HIPS to ABS can be chosen within a wide range, these polymers predominating.

The third component, according to the invention, of these blends is polycyclohexyl methacrylate or polycyclohexyl acrylate or a copolymer of cyclohexyl methacrylate or cyclohexyl acrylate with a further monomer building block, preferably with an ester of methacrylic acid, in particular methyl methacrylate.

Although it is possible in principle for a substantial proportion of the ternary blend to consist of the cyclohexyl acrylate polymer referred to below as a compatibility imparter (for example up to 50% by weight or more), an amount of less than 30% by weight is preferred and about 1-15% by weight is quite sufficient. The content of methyl methacrylate, where it is present, in the copolymer with cyclohexyl (meth)acrylate is determined by the degree of the desired compatibility-imparting action. As a rule, the content of MMA is not chosen too high and is in general kept below 85, preferably below 65, particularly preferably below 55, % by weight. The most suitable value is dependent on, for example, the content of acrylonitrile in the ABS.

The compatibility imparter is obtained by a conventional method of polymerization, ie. free radical, anionic or group transfer polymerization.

The blend can be prepared using all conventional methods, in general the melts being mixed in an extruder.

For further improvement of the properties, the blend can be provided with, for example, antioxidants, UV stabilizers, processing assistants or flameproofing agents.

EXAMPLES

Preparation of a cyclohexyl methacrylate homo- or copolymer 17 kg of monomer or monomer mixture together with 0.3% of tert-dodecyl mercaptan and 0.05% of benzoyl peroxide are introduced into a 40 l metal kettle with an anchor stirrer and are stirred (200 rpm) at about 80° C. A reaction rate of about 15%/h is established. At a solids content of 40–50%, 19 l of water containing 285 g of a commercial protective colloid (Luviskol K 90) and 19 g of sodium phosphate are added and the resulting suspension is completely polymerized. The stirring speed here is 270 rpm, and the temperature is increased stepwise from 110° C. for 3 hours to 130° C. for 3 hours and finally to 140° C. for 4 hours. The bead polymer is isolated, washed and then dried at 60° C. under reduced pressure.

The content of volatile constituents of such a product is about 2%. The polymers obtained are listed in Table 1.

Preparation of the polymer blends

The blends are prepared in a type ZSK 30 extruder from Werner & Pfleiderer. The HIPS used is commercial high impact polystyrene 476 L from BASF AG and the commercial ABS component used is DOW ABS 2020. The components are mixed in a fluid mixer and metered via a belt weigher into the extruder. The compatibility imparter is fed in via a further belt weigher. Mixing is carried out at 240° C. and with a throughput of 10 kg/h.

15% by weight of a blend of polystyrene 168 N (BASF) and Luran 358 N (BASF) are used in order to produce comparable conditions and thus determine the effect of cyclohexyl esters on the properties of the blend. The effect of the novel copolymer on the notched impact strength is immediately evident from Table 3: in virtually all cases, it is substantially increased compared with the Comparative Experiments. Only copolymer III does not show this effect, and this is quite obviously due to the fact that the MMA content is already too high here.

The investigation also shows that the foam adhesion is substantially increased by ABS in all cases compared with polystyrene 476 L. The resistance to Frigen is also improved in all cases, ie. such blends are useful in every case.

TABLE 1

| Copolymer | MMA Amount in % by wt. | CHMA* Amount in % by wt. | Volatile components in % by wt. | VN (CHCl$_3$) in ml/g |
|---|---|---|---|---|
| I | 25 | 75 | 1.9 | 124.2 |
| II | 50 | 50 | 2.6 | 119.8 |
| III | 75 | 25 | 2.1 | 118.1 |

*CHMA: Cyclohexyl methacrylate

TABLE 2

| Experiment | 476 L[3] Amount in % by wt. | DOW ABS 2020[4] Amount in % by wt. | PS 168 N[1] Amount in % by wt. | Luran 358 N[2] Amount in % by wt. | Copolymer I (MMA/CHMA) 25/75 in % by wt. | Copolymer II (MMA/CHMA) 50/50 in % by wt. | Copolymer III (MMA/CHMA) 75/25 in % by wt. |
|---|---|---|---|---|---|---|---|
| Comparison 1 | 50.0 | 50.0 | — | — | — | — | — |
| Comparison 2 | 47.5 | 47.5 | 2.5 | 2.5 | — | — | — |
| Comparison 3 | 45.0 | 45.0 | 5.0 | 5.0 | — | — | — |
| Comparison 4 | 42.5 | 42.5 | 7.5 | 7.5 | — | — | — |
| Comparison 5 | 100.0 | — | — | — | — | — | — |
| Comparison 6 | — | 100.0 | — | — | — | — | — |
| Example 1 | 45.0 | 45.0 | — | — | 10 | — | — |
| Example 2 | 45.0 | 45.0 | — | — | — | 10 | — |
| Example 3 | 45.0 | 45.0 | — | — | — | — | 10 |
| Example 4 | 47.5 | 47.5 | — | — | — | 5 | — |
| Example 5 | 42.5 | 42.5 | — | — | — | 15 | — |

[1]Polystyrene molding material of BASF AG, VN (toluene): 120 ml/g
[2]Styrene/acrylonitrile molding material of BASF AG, VN (DMF): 80 ml/g
[3]High impact polystyrene of BASF AG
[4]Toughened styrene/acrylonitrile copolymer (ABS) of Dow Chemical Co.

Tests

1. The viscosity (VN) is measured according to DIN 53,726 in 0.5% strength solution.
2. The notched impact strength ($a_{k1}$) is determined according to DIN 53,753 in kJ/m$^2$ on pressed bars.
3. The foam adhesion is tested by covering pressed panels (pressing temperature 200° C.) with a commercial polyurethane foam. Curing is effected overnight and on the next day the panels are torn. If substantial residues of foam adhere to the panels, ie. the adhesive forces are greater than the strength of the foam itself, the foam adhesion is rated as good. If virtually no residues remain on the pressed panel, the foam adhesion is rated as poor.
4. Resistance to halohydrocarbons: Standard small pressed bars are kept in Frigen R 11 for 60 seconds and then examined visually to determine whether blisters have formed.

DISCUSSION OF THE EXAMPLES

Table 2 gives an overview of the composition of the samples investigated. For comparative purposes, 1:1 blends of the polystyrene brand 476 L (BASF) and DOW ABS 2020 without an additive or with 5, 10 or

TABLE 3

| Example | $a_{k1}$ in kJ/m$^2$ | Foam adhesion | Frigen test |
|---|---|---|---|
| Comparison 1 | 5.3 | Good | Blister-free |
| Comparison 2 | 5.7 | Good | " |
| Comparison 3 | 5.8 | Good | " |
| Comparison 4 | 5.6 | Good | " |
| Comparison 5 | — | Poor | Blistered |
| Comparison 6 | — | Good | Blister-free |
| Example 1 | 8.3 | Good | " |
| Example 2 | 8.3 | Good | " |
| Example 3 | 5.4 | Good | " |
| Example 4 | 8.8 | Good | " |
| Example 5 | 8.8 | Good | " |

We claim:
1. A molding material consisting essentially of:
(a) high impact polystyrene,
(b) a polymer selected from the group consisting of an acrylonitrile-butadiene-styrene copolymer, polymethyl (meth)acrylate, a polyphenylene ether, polyvinyl chloride and a thermoplastic polyester, and
(c) from about 1 to about 5% by weight of a hompolymer or copolymer of cyclohexyl (meth)acry- late, said copolymer containing not less than 45% by weight of units of cyclohexyl (meth)acrylate.

2. The molding material of claim 1 wherein component (b) is an acrylonitrile-butadiene styrene copolymer.

3. The molding material of claim 1 wherein component (b) is polymethyl (meth)acrylate.

4. The molding material of claim 1 wherein component (b) is a polyphenylene ether.

5. The molding material of claim 1 wherein component (b) is polyvinyl chloride.

6. The molding material of claim 1 wherein component (b) is a thermoplastic polyester.

7. The molding material of claim 1 wherein component (b) is a homopolymer of cyclohexyl (meth)acrylate.

8. The molding material of claim 1 wherein component (c) is a copolymer of cyclohexyl (meth)acrylate and methyl methacrylate.

* * * * *